United States Patent
Moore

(10) Patent No.: US 6,830,223 B1
(45) Date of Patent: Dec. 14, 2004

(54) FORCE SENSOR ROD

(75) Inventor: Daniel Lee Moore, Edmonds, WA (US)

(73) Assignee: Tyee Aircraft, Everett, WA (US)

( * ) Notice: Subject to any disclaimer, the term of this patent is extended or adjusted under 35 U.S.C. 154(b) by 451 days.

(21) Appl. No.: 09/716,767

(22) Filed: Nov. 16, 2000

(51) Int. Cl.$^7$ .............................................. B64C 13/04
(52) U.S. Cl. ........................ 244/220; 244/234; 244/236
(58) Field of Search ................... 73/802, 796; 244/236, 244/232, 233, 234, 220

(56) References Cited

U.S. PATENT DOCUMENTS

| | | | |
|---|---|---|---|
| 2,505,070 A | 4/1950 | Shaw | 73/141 |
| 2,544,738 A | 3/1951 | Tint | 73/133 |
| 3,447,766 A | 6/1969 | Palfreyman | 244/83 |
| 3,561,263 A * | 2/1971 | Ward et al. | 73/862.045 |
| 3,561,280 A | 2/1971 | MacPhee et al. | 74/471 |
| 3,652,111 A | 3/1972 | Dent | 285/382 |
| 3,729,990 A | 5/1973 | Oliver | 73/133 |
| 4,097,163 A * | 6/1978 | Dubuque | 403/274 |
| 4,437,351 A | 3/1984 | McGrann et al. | 73/862.05 |
| 4,932,253 A | 6/1990 | McCoy | 73/151 |
| 5,195,381 A | 3/1993 | Keibler | 73/862.05 |
| 6,311,566 B1 * | 11/2001 | Ferguson | 73/802 |

FOREIGN PATENT DOCUMENTS

| | | |
|---|---|---|
| DE | 44 30 463 | 2/1996 |
| FR | 2 599 793 | 12/1987 |
| GB | 2 050 977 | 1/1981 |

OTHER PUBLICATIONS

Kulite Semiconductor Products Inc.—Tension/Compression Load Cell—TC–1500—Data Sheet.*

Miniature Load Cell XFTC–160–M10, GS Sensors, Jul. 1999, one page, Ephrata, PA.

Kulite Semiconductor Products Inc.—Tension/Compression Load Cell—TC–1500—Data Sheet.

* cited by examiner

Primary Examiner—Peter M. Poon
Assistant Examiner—T. D. Collins
(74) Attorney, Agent, or Firm—Christie, Parker & Hale, LLP

(57) ABSTRACT

A force sensor rod for an aircraft actuator system. The force sensor rod is constructed from a tube and a force sensing transducer. The force sensing transducer has a body containing a force responsive primary element and electronic circuitry. The force sensing transducer is provided with a protruding end composed of a material relatively harder than the tube material. The threads on the protruding end terminate in a plurality of axially spaced grooves adjacent to the force sensing transducer body and normal to the axis of the force sensing transducer. The tube is threaded onto the protruding end of the force sensing transducer and swaged onto the protruding end by causing the tube material to flow into the grooves.

22 Claims, 4 Drawing Sheets

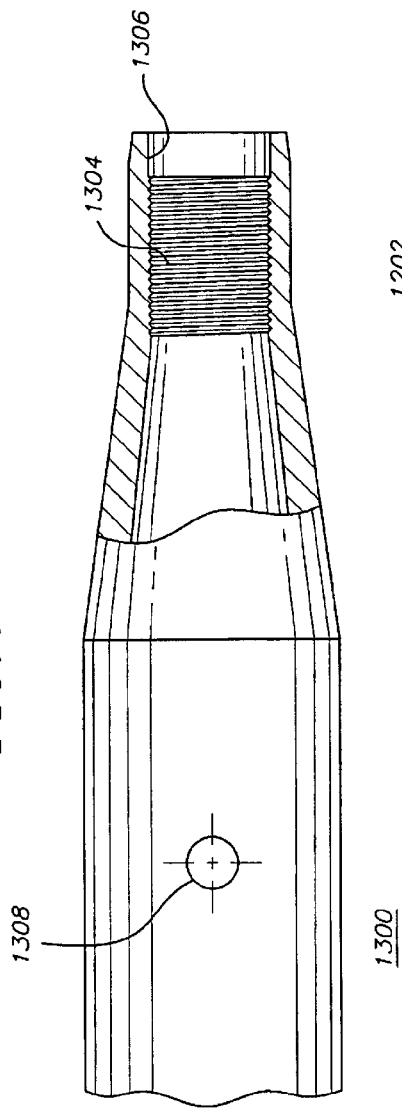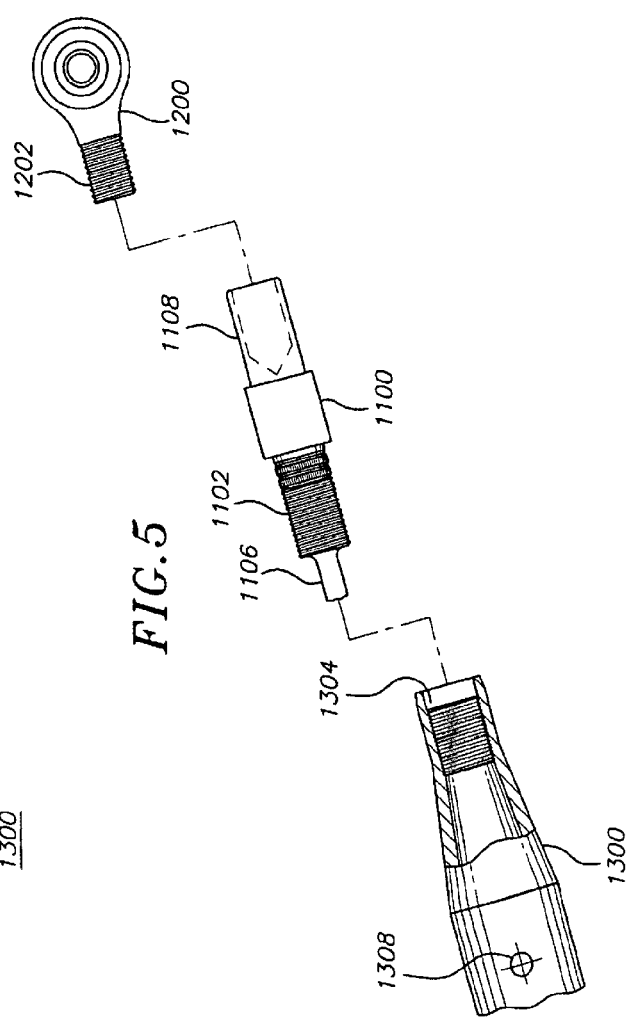

FORCE SENSOR ROD

BACKGROUND OF THE INVENTION

The present invention relates generally to control rods used in aircraft actuator systems and more particularly to providing instrumented control rods.

Actuator systems are used within an aircraft to transmit a pilot's control inputs from controls in a cockpit to control surfaces on the exterior of the aircraft such as ailerons and rudders. In some actuator systems, the amount of force exerted by the pilot to the control in the cockpit is directly proportional to the amount of force required to operate the control surface. The amount of force applied by a pilot to a control is indicative of many things. For example, if a pilot must increase the amount of force applied to a control to operate a control surface, it may mean that a component of the actuator system linked to the control or the control surface itself is not working properly or has failed. Therefore, it would be useful to know how much force is being transferred between components within an actuator system in order to diagnose the actuator system during operation of the actuator system. More particularly, it would be beneficial to record the amount of force transferred between components in an actuator system in a flight recorder to help in diagnosing problems with actuator systems and control surfaces.

Putting force sensing and reporting components into an actuator system is difficult. In existing systems, there simply may not be enough space to accommodate a new component without completely restructuring the aircraft containing the actuator system. Even if the physical space is available for a new component, there may be significant amounts of EMF emissions in the area making the choice of sensing and reporting components difficult. Additionally, the only available space may have extreme thermal or environmental conditions that may cause premature failure of an exposed and sensitive measurement system. In new actuator systems, the introduction of a new component into an existing actuator system design may require a series of expensive design iterations where many different components within an aircraft are redesigned to accommodate the new component.

Therefore, a need exists for a method to integrate force sensing and recording components into existing and newly designed actuator systems in an unobtrusive and cost effective way. Preferably the integration method should be adaptable to many different kinds of actuator systems and not unduly increase the overall weight of the actuator system. The present invention meets such need.

SUMMARY OF THE INVENTION

A force sensor rod useful as a control rod in an aircraft actuator system is provided by the present invention. The force sensor rod is constructed from a tube and a force sensing transducer such as a load cell. The force sensing transducer has a body containing a force responsive primary element and the force responsive primary element's associated electronic circuitry. The force sensing transducer is provided with a protruding end composed of a material relatively harder than the tube material. The threads on the protruding end preferably terminate in a plurality of axially spaced grooves adjacent to the force sensing transducer body and normal to the axis of the force sensing transducer. The tube is threaded onto the protruding end of the force sensing transducer and swaged onto the protruding end by causing the tube material to flow into the grooves.

In one embodiment, the force sensing transducer includes a cable extending from the protruding end and the cable is routed through the tube.

In another embodiment, a second protruding end is provided. The second protruding end is bored and tapped creating a female threaded connection for a rod end. Alternatively, the second protruding end is threaded providing a male threaded connection for a rod end.

The force sensor rod is readily incorporated into an aircraft actuator system. The force sensor rod is operably coupled between two components of an actuator system. The force sensing transducer is connected to a signal conditioning module containing a power supply and a signal conditioner. The signal conditioning module supplies excitation power for the force sensing transducer and signal conditioning for an output signal from the force sensing transducer. The conditioned output signal is provided to a flight recorder for recording.

An advantage of a preferred force sensor rod is that it has a form factor similar to a conventional control rod making it suitable to retrofit existing actuator systems and easy to design into new actuator systems. Furthermore, the force sensor rod is easily adapted to different control rod ends without extensive modifications.

An additional advantage of a preferred force sensor rod is that the components are threaded and then swaged together creating a permanent and secure connection that does not require additional lock nuts or other kinds of connection locking mechanisms. This creates a lightweight and sleek design suitable for use in an aircraft.

A further advantage of a preferred force sensor rod is that the force sensing transducer is coupled to the tube with a swaged connection creating a hermetically sealed enclosure protecting the cable exiting the force sensing transducer. This adapts the force sensing transducer for use in hostile environments where solvents, hydraulic fluids, and corrosive liquids are used. Furthermore, routing the cable through the tube provides electrical shielding and mechanical protection as well.

BRIEF DESCRIPTION OF THE DRAWINGS

These and other features, aspects, and advantages of the present invention will become better understood with regard to the following description, appended claims, and accompanying drawings where:

FIG. 4 is a side view of a threaded tube prepared for use as a rod body of the force sensor rod;

FIG. 5 is an exploded view of a sensor rod;

DETAILED DESCRIPTION OF THE INVENTION

Figure 1:
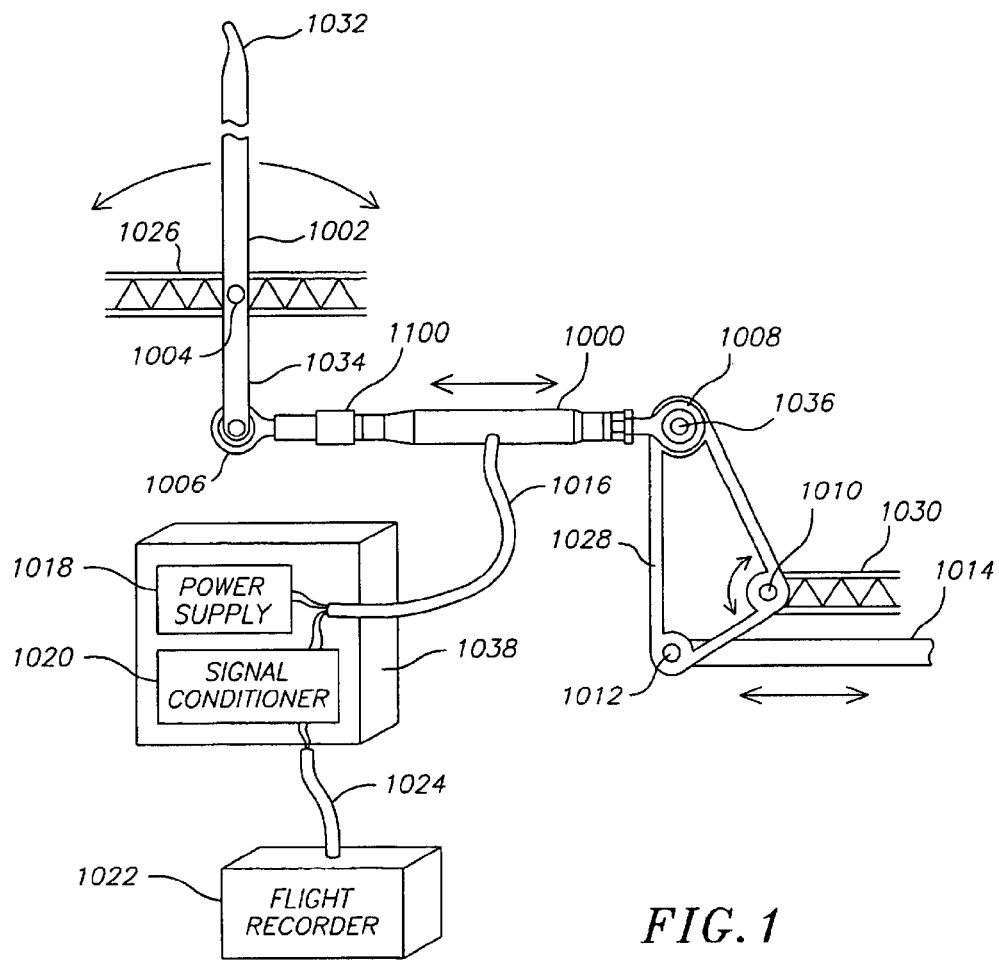
FIG. 1 is an illustration of using a force sensor rod of the present invention in an aircraft control linkage.

Control rods are elements used in actuator systems to transfer forces and loads between components within the actuator system. For example, control rods are often used to transfer control inputs from the pilot into the actuator system. Replacing a control rod in an actuator system with a force sensor rod adapts the actuator system for measurement and recording of the forces transferred between components in the actuator system. FIG. 1 is an illustration of using a force sensor rod of the present invention in an aircraft control linkage to measure and record control forces applied by a pilot to a control surface or actuator system. Control lever 1002 comprises top end 1032, bottom end 1034, and control lever pivot attachment point 1004 located between the top end and the bottom end. The control lever is pivotally attached to first fixed member 1026 at the control lever pivot attachment point within an aircraft. The control lever is moveably attached at the bottom end to force sensor rod 1000 at first sensor rod end 1006. The force sensor rod is moveably attached to control arm 1028 at second sensor rod end 1008. The control arm comprises a first attachment point 1036, a second attachment point 1012, and a control arm pivot attachment point 1010. The control arm is pivotally attached at the control arm pivot attachment point to second fixed member 1030 within the aircraft. The control linkage arm is moveably attached to control rod 1014 at attachment point 1012.

Application of a control force to top end 1032 of control lever 1002 causes the control lever to pivot about control lever pivot attachment point 1004 at first fixed member 1026. This pivoting motion transfers the control force to control arm 1028 through force sensor rod 1000 attached to bottom end 1034 of the control lever. The control force causes the control arm to pivot about control arm pivot attachment point 1010 transferring the control force to control rod 1014. The force sensor rod is thus an integral component of the control linkage and is subjected to the control forces applied by a pilot to the control lever.

Force sensor rod 1000 contains force sensing transducer 1100 aligned to respond to the control force transferred through the force sensor rod. The force sensing transducer is operably coupled to signal conditioning module 1038 via sensor cable 1016. The signal conditioning module contains power supply 1018 for excitation of the force sensing transducer and signal conditioner 1020 for reception and amplification of force response signals transmitted by the sensing element. The signal conditioner is operably coupled to flight recorder 1022 for recording the amplified force response signals.

Application of a control force to control lever 1032 applies the control force to force sensor rod 1000 as previously described. Power supply 1018 in signal conditioning module 1038 excites force sensing transducer 1100 in the force sensor rod such that the force sensing transducer is enabled to transform the applied control force into an output signal proportional to the applied control force. The output signal is transmitted to signal conditioner 1020 and the signal conditioner amplifies the output signal and sends the amplified output signal to flight recorder 1022 for recording. Those skilled in the art of instrumentation will recognize that many different configurations of signal conditioning modules and flight recorders may be used to excite the force sensor rod and condition and record the resultant output signal.

Figure 2:
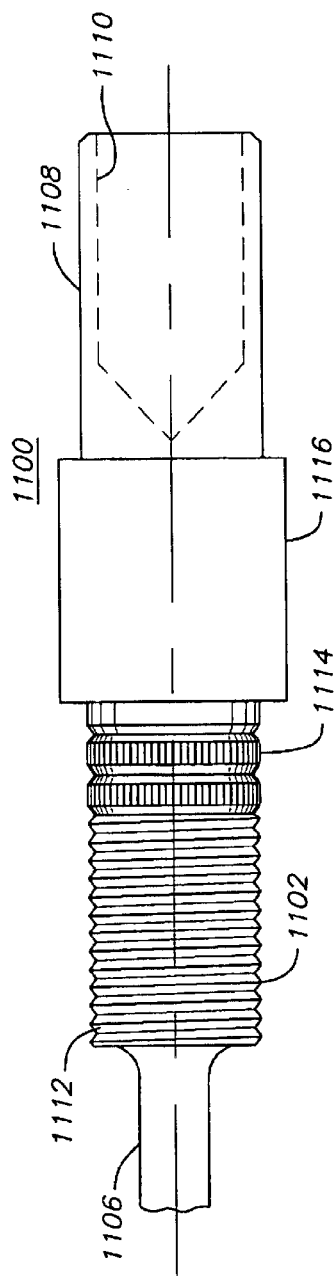
FIG. 2 is a side view of a sensor prepared for use in constructing the force sensor rod.

FIG. 2 is a side view of a sensor prepared for use in constructing the force sensor rod. Force sensing transducer 1100 is a load cell comprising body 1116. The body contains a force responsive primary element and strain gauge resistive elements fixedly attached to the force responsive primary element and configured as a temperature compensated Wheatstone bridge. The load cell responds to both tensile and compressive forces. The force sensing transducer further comprises a first protruding end 1102 with extending excitation and signal cable 1106, and a second protruding end 1108. Those skilled in the art of instrumentation will recognize that any number of force sensing transducers may be used alone or in combination within a force sensor rod to measure linear, bending, and rotary forces experienced by the force sensor rod.

First protruding end 1102 of force sensing transducer 1100 has external screw threads 1112 having a major diameter and a minor diameter. The external screw threads extend from a free end of the first protruding end, along the length of the first protruding end, towards body 1116 of the force sensing transducer. The threaded length of the first protruding end is commensurate with the intended maximum force to be applied to the a force sensor rod comprising the force sensing transducer. At the body end of the external screw threads, at least one row of grooves 1114 are disposed. The grooves are preferably disposed in a direction parallel to the axis of the force sensing transducer and at right angles to any turning moment tending to rotate the force sensing transducer relative to any threaded element receiving the first protruding end of the force sensing transducer.

Second protruding end 1108 of force sensing transducer 1100 has internal screw threads 1110 having a major diameter and a minor diameter. The threads extend from an open end of the second protruding end along the length of the second protruding end of the force sensing transducer towards the body of the force sensing transducer. In one embodiment, the external thread is a 7/16-28 UNJEF and the internal thread is a 3/8-24 UNJF.

In another embodiment, the second protruding end is externally threaded.

In another embodiment, the second protruding end is externally threaded and grooved in a manner similar to the first protruding end.

In a further alternative embodiment, the rod end is threaded into the second protruding end of the force sensing transducer with an adhesive sealer coating the threads. An overlap swaging operation is performed, creating a swaged connection over a portion the threaded connection.

Figure 3:
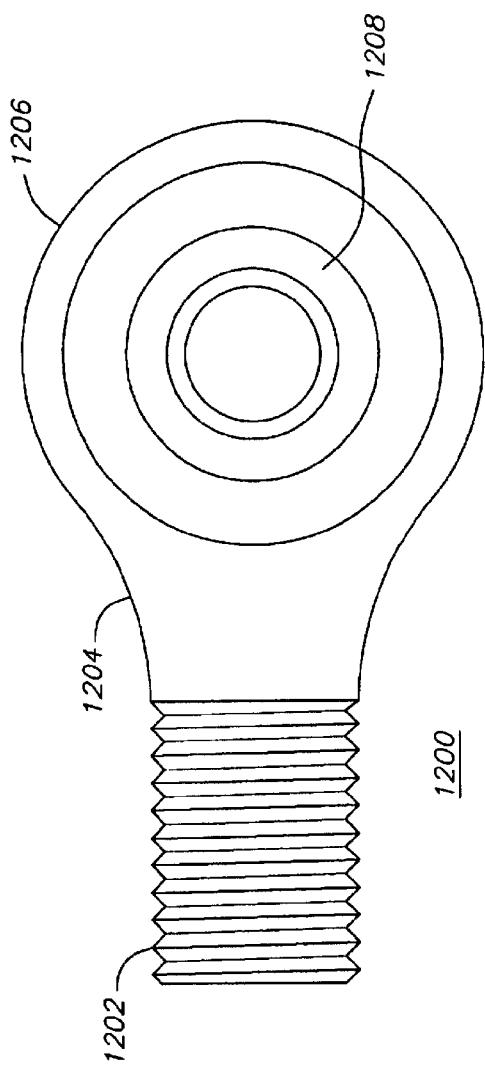
FIG. 3 is a side view of a rod end used in the force sensing rod.

FIG. 3 is a side view of a rod end used in the force sensing rod. Rod end 1200 is a connector to a push-pull load, such as an eye bolt, clevis, or the like. The rod end has rod end external screw threads 1202. The rod end external screw threads extend from a free outer end portion of the rod 1204 toward an inner end portion. The rod end external screw threads are of appropriate size for mating with internal threads 1110 of second protruding end 1108 of force sensing transducer 1100 (all of FIG. 2). The rod end further comprises a connector terminating in eye 1206 with antifriction bearing 1208. Alternatively, the rod end may terminate in a manner suitable for attachment to another element such as a threaded or socketed connector.

FIG. 4 is a side view of a threaded tube prepared for use as a rod body of the force sensor rod. Tube 1300 has cable opening 1308 for exit of excitation and signal cable 1106 (FIG. 2) of force sensing transducer 1100 (FIG. 2). The tube is preferably composed of a softer material than external screw threads 1112 of first protruding end 1102 (all of FIG. 2) of the force sensing transducer. The tube has an internally threaded bore 1304 for mating with the external screw threads of first protruding end of the force sensing transducer. Entrance portion 1306 to the internally threaded bore has a diameter substantially equal to the major axis of the external screw threads and thus the external screw threads are readily threaded into the internally threaded bore without interference until grooves 1114 (FIG. 2) of the force sensing transducer are aligned with the entrance portion. In one embodiment, the entrance portion to the internally threaded bore has a diameter not greater than the major axis of the external screw threads.

Referring again to FIG. 2, in a further alternative embodiment of a sensor used in a sensor rod, the rod end is threaded and grooved similarly to the first protruding end of the force sensing transducer. The second protruding end 1108 of force sensing transducer 1100 is provided with an entrance portion similar to the entrance portion of the tube. Once threaded together, the female threaded end of the force sensing transducer is swaged onto the rod end. In this way, the force sensing transducer and the rod end are fixedly connected using a swaged connection.

FIG. 5 is an exploded view of a sensor rod. Rod end 1200 is threaded into internally threaded second protruding end 1108 of force sensing transducer 1100. As previously described, the force sensing transducer has excitation and signal cable 1106 extending from a first protruding end. The excitation and signal cable is inserted through internally threaded bore 1304 into the interior of tube 1300 exiting the tube through cable exit opening 1308. The force sensing transducer is threaded into the internally threaded bore of the tube.

Figure 6:
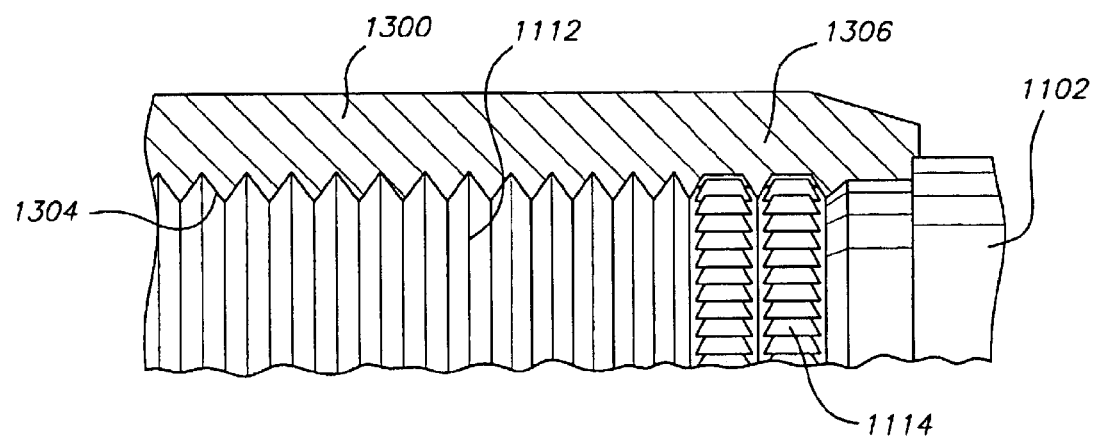
FIG. 6 is a cross-sectional view of a swaged connection of the force sensor rod.

FIG. 6 is a cross-sectional view of a swaged connection. A swaging force is applied to the external surface of tube 1300. Preferably the contact of the swaging tool with the tube is limited to the external area of the tube opposite entrance portion 1306 aligned with grooves 1114 of first protruding end 1102 of a force sensing transducer. With proper swaging, metal from the tube is caused to flow into the grooves of the first protruding end of the force sensing transducer.

In an alternative embodiment, the tube is threaded onto the first protruding end of the force sensing transducer with an adhesive sealer coating the threads. An angle swaging operation is performed, creating a swaged connection.

In a further alternative embodiment, the tube is threaded onto the first protruding end of the force sensing transducer with an adhesive sealer coating the threads. An overlap swaging operation is performed, creating a swaged connection over a portion the threaded connection.

Figure 7:
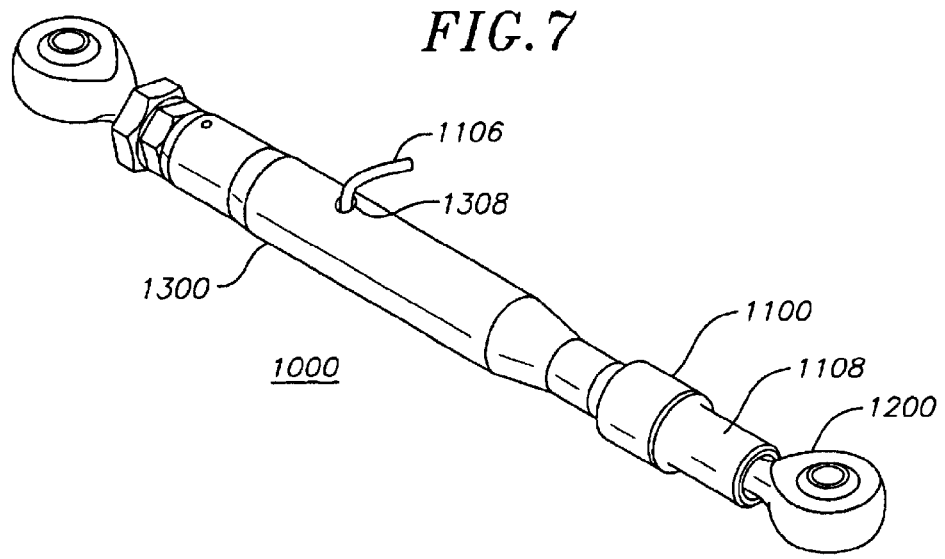
FIG. 7 is a perspective view of a force sensor rod according to the present invention.

FIG. 7 is a perspective view of a force sensor rod according to the present invention. Force sensor rod 1000 comprises rod end 1200 connected to force sensing transducer 1100 that is fixed to tube 1300. Excitation and signal cable 1106 of the force sensing transducer exits the body of the tube via cable hermetically sealed exit opening 1308.

Alternatively, the excitation and signal cable exits directly from the body of the force sensing transducer.

The preceding description has been presented with reference to specific embodiments of the invention shown in the drawings. Workers skilled in the art and technology to which this invention pertains will appreciate that alteration and changes in the described processes and structures can be practiced without departing from the spirit, principles and scope of this invention.

Accordingly, Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

What is claimed is:

1. A force sensor rod for an aircraft actuator system, comprising:

a force sensing transducer including:
a body containing a force responsive primary element and electronic circuitry operably coupled to the force responsive primary element; and
external screw threads extending from a free end of the body, the external screw threads terminating in a plurality of longitudinally extending grooves to prevent rotation; and
a tube composed of a material relatively softer than the external screw threads;
wherein the tube is threadedly coupled to the free end with the tube material located in the grooves.

2. The force sensor rod for an aircraft actuator system of claim 1, further comprising:
a cable extending from the free end of the force sensing transducer, the cable operably coupled to the electronic circuitry and extending through the tube.

3. The force sensor rod for an aircraft actuator system of claim 1, wherein the body includes a body portion and a first end protruding from the body portion, the first protruding end having the external threads and the plurality of longitudinally extending grooves.

4. The force sensor rod for an aircraft actuator system of claim 3, further comprising:
a rod end having external threads;
wherein the body includes a second end protruding from the body portion, the second protruding end having internal threads; and
wherein the rod end is threadedly coupled to the second protruding end and the second protruding end is swaged onto the rod end.

5. The force sensor rod for an aircraft actuator system of claim 1 wherein the force sensing transducer is a load cell.

6. A method of assembling a force sensor rod for an aircraft actuator system, comprising:
providing a force sensing transducer including a body containing a force responsive primary element and electronic circuitry operably coupled to the force responsive primary element;
creating external screw threads extending from a free end of the body;
terminating the external screw threads in a plurality of longitudinally extending grooves to prevent rotation;
threading a tube onto the free end; and
swaging the tube onto the body of the force sensing transducer.

7. The method of assembling a force sensor rod for an aircraft actuator system of claim 6, further comprising:
extending a cable from the free end of the body and through the tube and operably coupling the cable to the electronic circuitry.

8. The method of assembling a force sensor rod for an aircraft actuator system of claim 6, further comprising:
providing an end protruding from the body;
creating internal threads in the protruding end; and
threading a rod end into the internal threads; and
swaging the protruding end onto the rod end.

9. An actuator system for an aircraft, comprising:
a force sensor rod, including:
  a force sensing transducer including:
    a body containing a force responsive primary element and electronic circuitry operably coupled to the force responsive primary element; and
    external screw threads extending from a free end of the body, the external screw threads terminating in a plurality of longitudinally extending grooves to prevent rotation; and
  a tube composed of a material relatively softer than the external screw threads;
  wherein the tube is threadedly coupled to the free end with the tube material located in the grooves;
a signal conditioning module operably coupled to the force sensing transducer, the signal conditioning module containing a power source and signal conditioning circuitry; and
a flight recorder operably coupled to the signal conditioning module, the flight recorder to record output signals from the signal conditioning module;
wherein the force sensor rod is operably coupled at the first rod end to a first actuator system component and operably coupled at the second rod end to a second actuator system component.

10. The actuator system for an aircraft of claim 9, further comprising:
a cable extending from the free end of the force sensing transducer and through the tube, the cable operably coupling the force sensing transducer and the signal conditioning module.

11. The actuator system for an aircraft of claim 9, further comprising:
a first end protruding from the force sensing transducer, the first protruding end having the external threads and plurality of longitudinally extending grooves.

12. The actuator system for an aircraft of claim 11, further comprising:
a rod end having external threads;
wherein the body includes a second end protruding from the body portion, the second protruding end having internal threads; and
wherein the rod end is threadedly coupled to the second protruding end and the second protruding end is swaged onto the rod end.

13. The actuator system for an aircraft of claim 9 wherein the force sensing transducer is a load cell.

14. The force sensor rod for an aircraft actuator system of claim 1 wherein the tube has an entrance portion whose inner diameter is substantially equal to an outer diameter of the sensor body's external screw threads.

15. The force sensor rod for an aircraft actuator system of claim 4 wherein the rod end includes an antifriction bearing for connection to a push-pull load.

16. The method of assembling a force sensor rod for an aircraft actuator system of claim 6 wherein the tube has an entrance portion whose inner diameter is substantially equal to an outer diameter of the sensor body's external screw threads.

17. The method of assembling a force sensor rod for an aircraft actuator system of claim 8 wherein the rod end includes an antifriction bearing for connection to a push-pull load.

18. The actuator system for an aircraft of claim 9 wherein the tube has an entrance portion whose inner diameter is substantially equal to an outer diameter of the sensor body's external screw threads.

19. The actuator system for an aircraft of claim 9 wherein the rod end includes an antifriction bearing for connection to a push-pull load.

20. The actuator system for an aircraft of claim 9 wherein the actuator system actuates a push-pull load for a control surface on an exterior of the aircraft.

21. The actuator system for an aircraft of claim 20 wherein the control surface is a rudder.

22. The actuator system for an aircraft of claim 20 wherein the control surface is an aileron.

* * * * *